US008169430B2

(12) United States Patent
Liu

(10) Patent No.: US 8,169,430 B2
(45) Date of Patent: May 1, 2012

(54) DISPLAY SYSTEM WITH LOW DROP-OUT VOLTAGE REGULATOR

(75) Inventor: Ping-Lin Liu, Tainan (TW)

(73) Assignee: Chimei Innolux Corporation (TW)

( * ) Notice: Subject to any disclaimer, the term of this patent is extended or adjusted under 35 U.S.C. 154(b) by 469 days.

(21) Appl. No.: 12/503,388

(22) Filed: Jul. 15, 2009

(65) Prior Publication Data

US 2010/0026676 A1 Feb. 4, 2010

(30) Foreign Application Priority Data

Jul. 29, 2008 (TW) ............................... 97128607 A

(51) Int. Cl.
*G06F 3/038* (2006.01)
*G05F 1/10* (2006.01)

(52) U.S. Cl. ......... 345/212; 345/211; 327/538; 315/291

(58) Field of Classification Search .................. 345/211, 345/212, 213, 214, 204
See application file for complete search history.

(56) References Cited

U.S. PATENT DOCUMENTS

| | | | | |
|---|---|---|---|---|
| 5,570,061 | A * | 10/1996 | Shimoda | 327/545 |
| 6,225,857 | B1 * | 5/2001 | Brokaw | 327/540 |
| 6,667,652 | B2 * | 12/2003 | Hosoki | 327/538 |
| 6,842,068 | B2 * | 1/2005 | Perrier et al. | 327/540 |
| 6,873,322 | B2 * | 3/2005 | Hartular | 345/212 |
| 7,142,040 | B2 * | 11/2006 | Naka et al. | 327/536 |

* cited by examiner

*Primary Examiner* — Duc Dinh
(74) *Attorney, Agent, or Firm* — Lowe Hauptman Ham & Berner, LLP

(57) ABSTRACT

A display system is disclosed in the present invention, which includes a low drop-out voltage regulator (LDO) for receiving an input voltage and providing a stable output voltage. The low drop-out voltage regulator includes a regulating circuit, a first switch, a current source circuit and an inverting circuit. The regulating circuit has a regulating circuit input, a regulating circuit output and a regulating circuit control terminal. The first switch selectively forms short or open circuit in accordance with ON/OFF states thereof. The current source circuit provides a fixed current to the control terminal and the output of the regulating circuit. The inverting circuit has an inverting circuit input coupled to the regulating circuit output and an inverting circuit output terminal coupled to the regulating circuit control terminal, the inverting circuit inverting the output voltage from the regulating circuit output. The regulating circuit control terminal adjusts the output voltage in accordance with a control voltage received thereof.

17 Claims, 7 Drawing Sheets

DISPLAY SYSTEM WITH LOW DROP-OUT VOLTAGE REGULATOR

CROSS REFERENCE TO RELATED APPLICATIONS

This application claims the right of priority based on Taiwan Patent Application No. 097128607 entitled "Display System with Low Drop-Out Voltage Regulator", filed on Jul. 29, 2008, which is incorporated herein by reference and assigned to the assignee herein.

FIELD OF INVENTION

The invention relates to a display system, particularly to a display system with a low drop-out voltage regulator (LDO) adopting an inverting circuit.

BACKGROUND OF THE INVENTION

There are kinds of voltage regulators for different needs. For example, some voltage regulators are provided for producing the drop-out voltage, which is the voltage difference between the output voltage and the input voltage in a normal operation. In circuitry applications, if the applied voltage is higher than the minimum operating voltage, it will result in the waste of power. Some other voltage regulators are provided as low drop-out voltage regulators (LDO) to limit the drop-out voltage, so as to make the output voltage close to the input voltage. LDO is mainly adopted in devices having low voltage sources, such as batteries. Some examples for this kind of devices are mobile phones, digital cameras, PDAs, laptops, GPS, etc.

As shown in FIG. 1A, a conventional LDO 100 includes a regulating circuit 102, a voltage divider 104 (also known as a potential divider), and an error amplifier 106. The regulating circuit 102 receives Vin from an external circuit (not shown) and generates Vout. The voltage divider 104 receives Vout from the regulating circuit 102 and passes it to the error amplifier 106. Then the error amplifier 106 feeds the Vout back to the regulating circuit 102.

FIG. 1B shows more details of the LDO 100. The regulating circuit 102 is implemented as a p-type metal-oxide-semiconductor field effect transistor (PMOS), and the voltage divider 104 adopts resistors 110 and 112 connected in series. LDO 100 receives input voltage Vin at its input and generates regulated output voltage Vout at its output. The gate of PMOS 102 receives the output voltage from the error amplifier 106. The positive input of the error amplifier 106 receives a reference voltage Vref, and the negative input receives feedback voltage from the voltage divider 104. The voltage divider 104 decreases the output voltage Vout to a fraction which is associated with the resistance of resistors 110 and 112, and feeds it into the negative input of the error amplifier 106 to compare with the reference voltage Vref. Then the error amplifier 106 generates regulating voltage to compensate or counteract the less stable output voltage of LDO 100.

If the output voltage Vout exceeds a predetermined level, the voltage at the negative input of the error amplifier 106 will go up. Thus the voltage difference between the positive and negative inputs will increase and bring up the gate voltage of PMOS 102. The increasing gate voltage of PMOS 102 will change the source-drain current and regulate the output voltage Vout and thus keep it stable.

However, the error amplifier 106 adopted in the conventional LDO 100 will consume a lot of power. And in some situations the use of voltage divider 104 may make the output voltage Vout unstable.

Therefore it is desired to have a novel display system adopting a simple, easy, and power saving way and less circuit elements to achieve the lower drop-out voltage.

SUMMARY OF THE INVENTION

One aspect of the invention is to provide a display system with a low drop-out voltage regulator (LDO). Another aspect of the invention is to use the display system to produce an output voltage which is stable and lower than the input voltage.

In an embodiment, the display system includes a LDO for receiving an input voltage and providing a stable output voltage. The LDO includes a regulating circuit, a first switch, a current source circuit and an inverting circuit.

In this embodiment, the regulating circuit has a regulating circuit input, a regulating circuit output and a regulating circuit control terminal. The first switch selectively forms a short/open circuit in accordance with ON/OFF states thereof. The current source circuit provides fixed current to the control terminal and the output of the regulating circuit. The inverting circuit has an inverting circuit input coupled to the regulating circuit output and an inverting circuit output terminal coupled to the regulating circuit control terminal, the inverting circuit inverting the output voltage from the regulating circuit output. The regulating circuit control terminal adjusts the output voltage in accordance with a control voltage received thereof.

The foregoing and other features of the invention will be apparent from the following more particular description of embodiments of the invention.

BRIEF DESCRIPTION OF THE DRAWINGS

The present invention is illustrated by way of example and not intended to be limited by the figures of the accompanying drawings, in which like notations indicate similar elements.

DETAILED DESCRIPTION

Figure 1A:
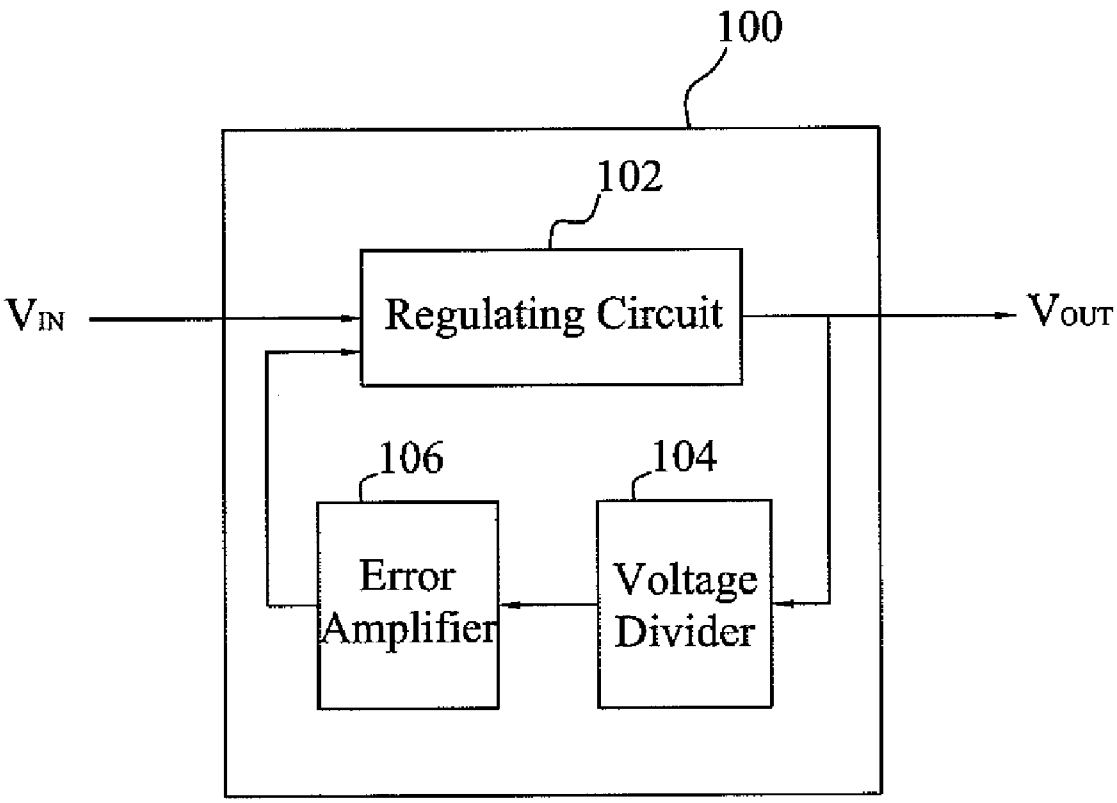
FIG. 1A (Prior Art)
FIG. 1A illustrates a LDO according to prior arts.
Figure 1B:
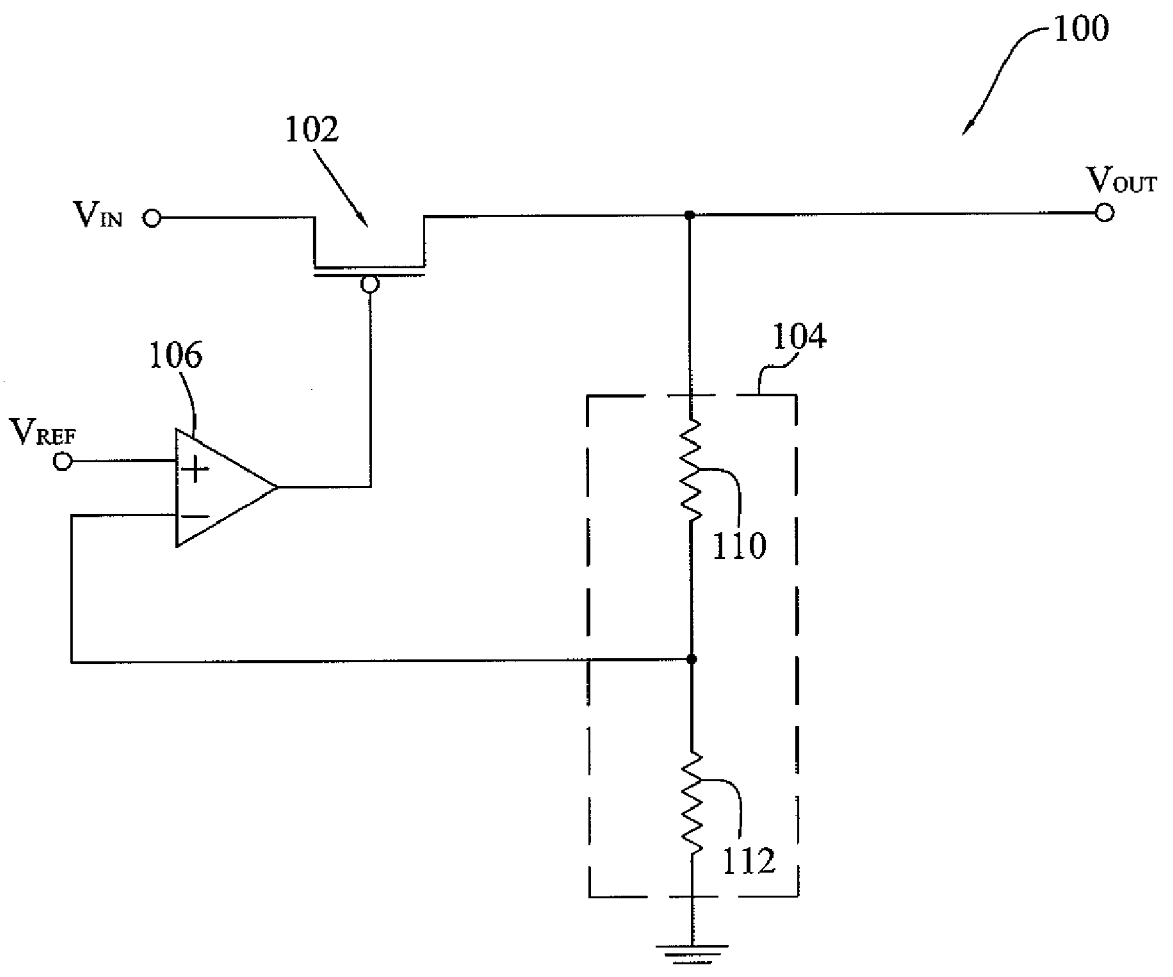
FIG. 1B (Prior Art)
FIG. 1B further illustrates the LDO according to prior arts.
Figure 2A:
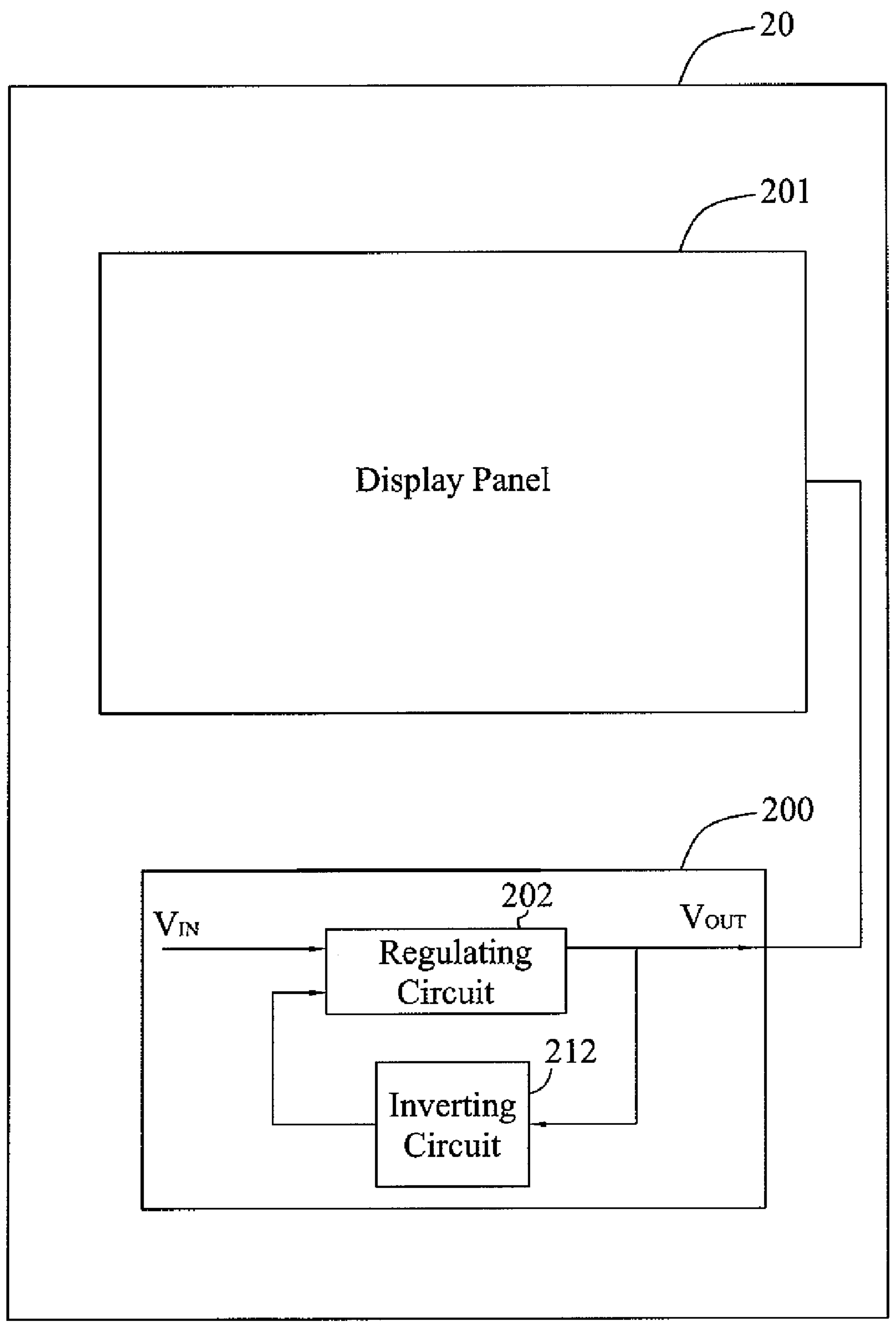
FIG. 2A illustrates a display system according an embodiment of the present invention.

FIG. 2A shows the block diagram of a display system 20, which has a LDO 200 and a display panel 201. The connections between the LDO 200 and the display panel 201 are also shown in FIG. 2A. The display system 20 could be a digital still-picture camera, a car navigation system, a mobile DVD-player, a gaming device, or a hand-held consumer appliance, a television, a computer monitor, a large-screen consumer electronics device, or a professional appliance.

LDO 200 has an input voltage Vin and an output voltage Vout. LDO 200 further includes a regulating circuit 202 and an inverting circuit 212. The regulation circuit 202 is provided for receiving the input voltage Vin and producing the output voltage Vout. Particularly, the output voltage Vout is lower than the input voltage Vin. The inverting circuit 212 receives the output voltage Vout from the regulating circuit 202, and inverts the output voltage Vout and feeds it back to the regulating circuit 202, to compensate (or counteract) the variance of the output voltage Vout at the output of the regulating circuit 202. More details will be provided later.

Figure 2B:
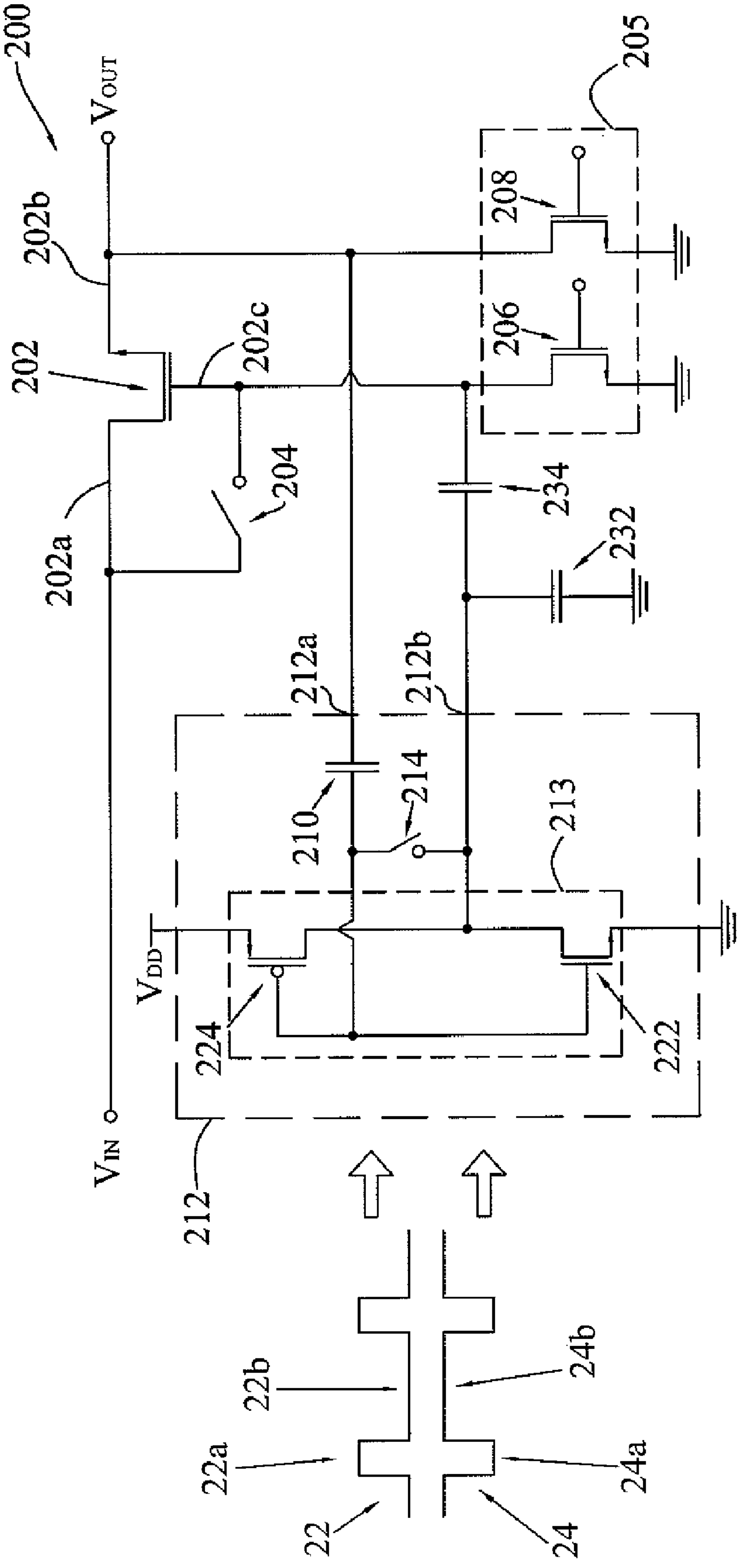
FIG. 2B illustrates a LDO according an embodiment of the present invention.

FIG. 2B provides more details about the LDO 200, which has the regulating circuit 202, a first switch 204, a current source circuit 205, and the inverting circuit 212.

A first trigger signal 22 and a second trigger signal 24 are provided to the LDO 200. The first trigger signal 22 and the second trigger signal 24 are square-wave signals having the same period but opposite logic levels. Particularly for both the first trigger signal 22 and the second trigger signal 24, each period could be equally divided into a first duration and a second duration, e.g., a first half period and a second half period. Then for the first duration (the first half period), the first trigger signal 22 is at the logic high level 22*a* and the second trigger signal 24 is at the logic low level 24*a*; for the second duration (the second half period), the first trigger signal 22 becomes the logic low level 22*b* and the second trigger signal 24 becomes the logic high level 24*b*.

The regulating circuit 202 includes a regulating circuit input 202*a* for receiving the input voltage Vin from an external circuit (not shown), a regulating circuit output 202*b* for outputting the output voltage Vout, and a regulating circuit control terminal 202*c* for receiving a control voltage so as to adjust the output voltage Vout at the output 202*b*. The first switch 204, disposed between the input 202*a* and the control terminal 202*c*, becomes ON/OFF according to the second trigger signal 24.

In this embodiment, the current source circuit 205 further includes a second switch 206 and a third switch 208. The second switch 206, disposed between the control terminal 202*c* and the ground, becomes ON/OFF according to the first trigger signal 22. When the second switch 206 turns on, a fixed current loop forms between the regulating circuit control terminal 202*c* and the ground, resulting in a specific control voltage (i.e., the gate voltage in some embodiments) therebetween. The third switch 208, disposed between the output 202*b* and the ground, becomes ON/OFF according to the first trigger signal 22. When the third switch 208 turns on, a fixed current loop forms between the regulating circuit output 202*b* and the ground, resulting in a specific output voltage.

The inverting circuit 212 has an inverting circuit input 212*a* and an inverting circuit output 212*b*. The inverting circuit input 212*a* is coupled to the regulating circuit output 202*b* for receiving the output voltage Vout. Meanwhile the inverting circuit output 212*b* is coupled to the regulating circuit control terminal 202*c*.

In one embodiment, the inverting circuit 212 further includes a first inverter 213, a fourth switch 214, and a first capacitor 210. In another embodiment, the first inverter 213 could be replaced by the NOR gate or NAND gate to achieve the same function. The fourth switch 214, disposed between the input and the output of the first inverter 213, becomes ON/OFF according to the second trigger signal 24. Then a short or an open circuit is formed between the input and the output of the first inverter 213 according to ON/OFF of the fourth switch 214. The short circuit between the input and the output of the first inverter 213 will result in a bias and the operating point of inverting circuit is thus formed. The first capacitor 210 has a node connected to the inverting circuit input 212*a* and another node connected to the input of the first inverter 213. The first capacitor 210 receives the output voltage Vout from the output 202*b* and passes it to the inverting circuit 212.

In another embodiment, LDO 200 further includes a second capacitor 232 and a third capacitor 234. The second capacitor 232 is disposed between the inverting circuit output 212*b* and a ground to avoid high-frequency responses. The third capacitor 234 is disposed between the inverting circuit output 212*b* and the control terminal 202*c*. Note that the second capacitor 232 and the third capacitor 234 can be either disposed inside the LDO 200 or outside the LDO 200, depending on the need of circuit design.

As mentioned above, for the first duration, the first trigger signal 22 is at the logic high level 22*a*, the second trigger signal 24 is at the logic low level 24*a*, and the first switch 204, the second switch 206, the third switch 208, and the fourth switch 214 all become ON; for the second duration, the first trigger signal 22 is at the logic low level 22*b*, the second trigger signal 24 is at the logic high level 24*b*, and the first switch 204, the second switch 206, the third switch 208, and the fourth switch 214 all become OFF.

In one embodiment, the regulating circuit 202 is implemented as N type thin-film transistor (NTFT), wherein the drain is the input 202*a*, the source is the output 202*b*, and the gate is the control terminal 202*c*. In addition, the second switch 206 and the third switch 208 can be implemented as NTFTs or PTFTs. Preferably, the second switch 206 is implemented as an NTFT and its source is grounded and its drain is connected to the control terminal 202*c*; the third switch 208 is also implemented as an NTFT and its source is grounded and its drain is connected to the output 202*b*. NTFT 206 and NTFT 208 become ON/OFF according to the first trigger signal 22, which is received respectively at the gates of NTFT 206 and NTFT 208. When the first trigger signal 22 is at the logic high level 22*a*, the second switch 206 and the third switch 208 are ON; when the first trigger signal 22 is at the logic low level 22*b*, the second switch 206 and the third switch 208 are OFF.

The first inverter 213 of the inverting circuit 212 includes a NTFT 222 and a PTFT 224. The gate of PTFT 224 is connected to the gate of NTFT 222, and they together receive voltage from the inverting circuit input 212*a*. When the voltage received at the gates of NTFT 222 and PTFT 224 is higher than the input voltage at the operating point of the first inverter 213, the inverting circuit output 212*b* generates a lower voltage because PTFT 224 has a larger resistance than NTFT 222. On the contrary, when the voltage received at the gates of NTFT 222 and PTFT 224 is lower than the input voltage at the operating point of the first inverter 213, the inverting circuit output 212*b* generates a higher voltage because NTFT 222 has a larger resistance than PTFT 224.

To sum up, in the embodiment shown in FIG. 2B, the first switch 204 and the fourth switch 214 become ON/OFF according to the second trigger signal 24, and the second switch 206 and the third switch 208 become ON/OFF according to the first trigger signal 22. When the second trigger signal 24 is at the logic low level 24*a*, the first switch 204 and the fourth switch 214 become ON; when the second trigger signal 24 is at the logic high level 24*b*, the first switch 204 and the fourth switch 214 become OFF. In addition, when the first trigger signal 22 is at the logic high level 22*a*, the second switch 206 and the third switch 208 become ON; when the first trigger signal 22 is at the logic low level 22*b*, the second switch 206 and the third switch 208 become OFF.

The control manner using trigger signals mentioned above provides LDO 200 with two operating modes: a "low drop-out" mode and a "stable" mode. The low drop-out mode is to generate an output voltage lower than the input voltage. The stable mode is to stabilize the output voltage in order to properly operate the system. As following, the low drop-out mode and the stable mode will be discussed in more details with the operations of the first switch 204, the second switch 206, the third switch 208, and the fourth switch 214.

Figure 3A:
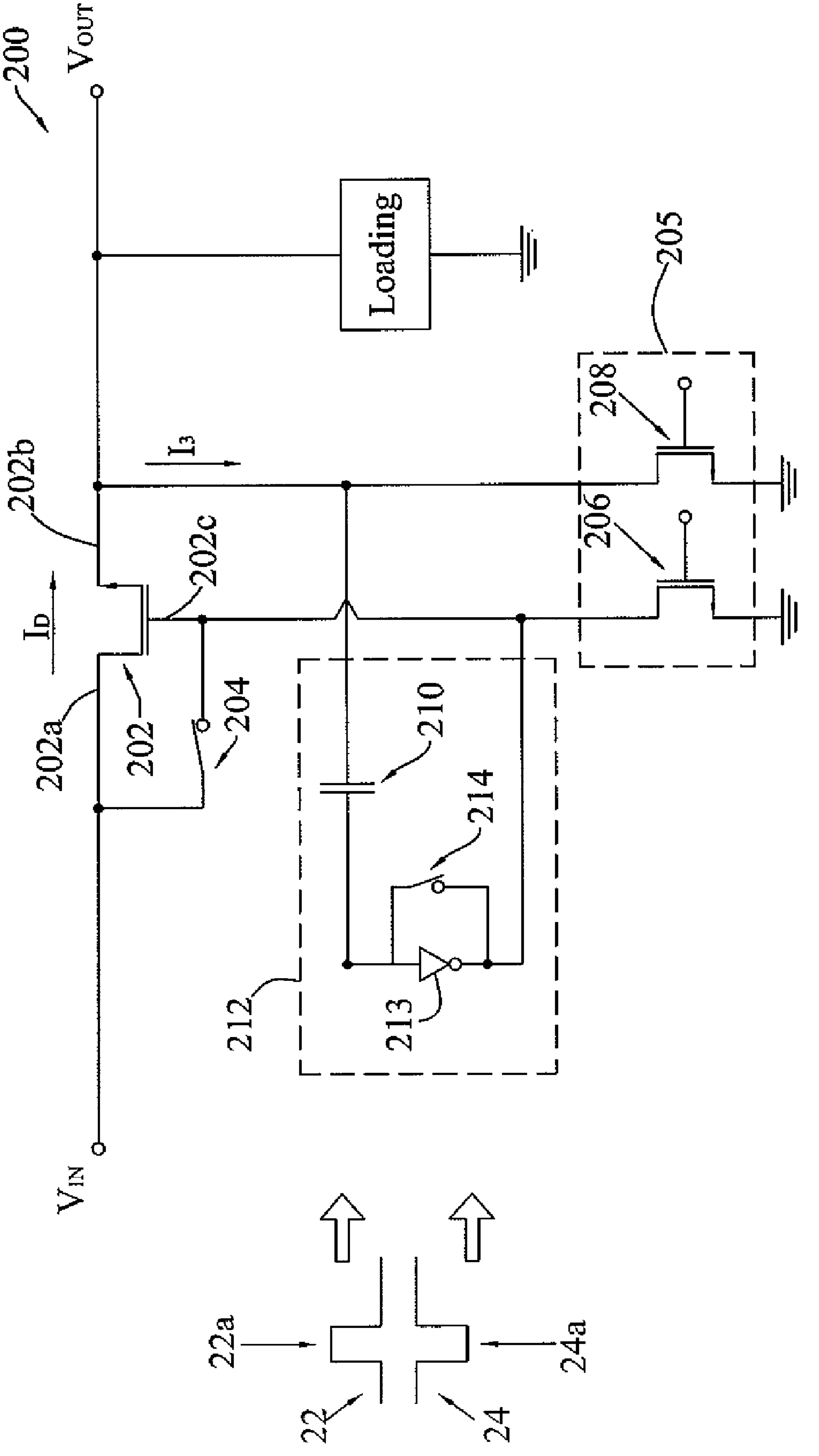
FIG. 3A illustrates the LDO of FIG. 2B in the low drop-out mode.

FIG. 3A shows LDO 200 in the low drop-out mode, where the second switch 206 and the third switch 208 are both implemented as NTFTs. During this low drop-out mode, the first trigger signal 22 is at the logic high level 22*a*, the second trigger signal 24 is at the logic low level 24*a*, and the first switch 204, the fourth switch 214, the second switch (NTFT) 206, and the third switch (NTFT) all become ON. The first inverter 213 has a short circuit according to ON of the fourth switch 214, so the voltage at the input of the inverting circuit input 212 is equal to the voltage at the output of the inverting circuit 212, as also illustrated in FIG. 2B.

When the first switch 204 is ON, it functions as an equivalent resistor, which results in a drop-out for the input voltage Vin of the regulating circuit input 202*a* and further forms a gate voltage VG at the control terminal 202*c*. Refer to the current-voltage equation of the field effect transistor:

$$I_D=K*(V_{GS}-V_{TH})^2,$$

wherein $I_D$ is the drain current flowing from the drain 202*a* to the source 202*b* and is related to the size of the field effect transistor (NTFT); K is a constant; $V_{GS}$ is the gate-source voltage; $V_{TH}$ is the threshold voltage, which is a constant.

Thus the gate voltage $V_G$ and the drain current $I_D$ of NTFT 202 can be derived for a desired output voltage Vout ($V_s$). Note that $I_D$ is equal to the current $I_3$ of NTFT 208, so the size of NTFT 208 also determines $I_D$. Accordingly, the source voltage $V_s$, i.e., the output voltage Vout, can be derived from the equation above.

Figure 3B:
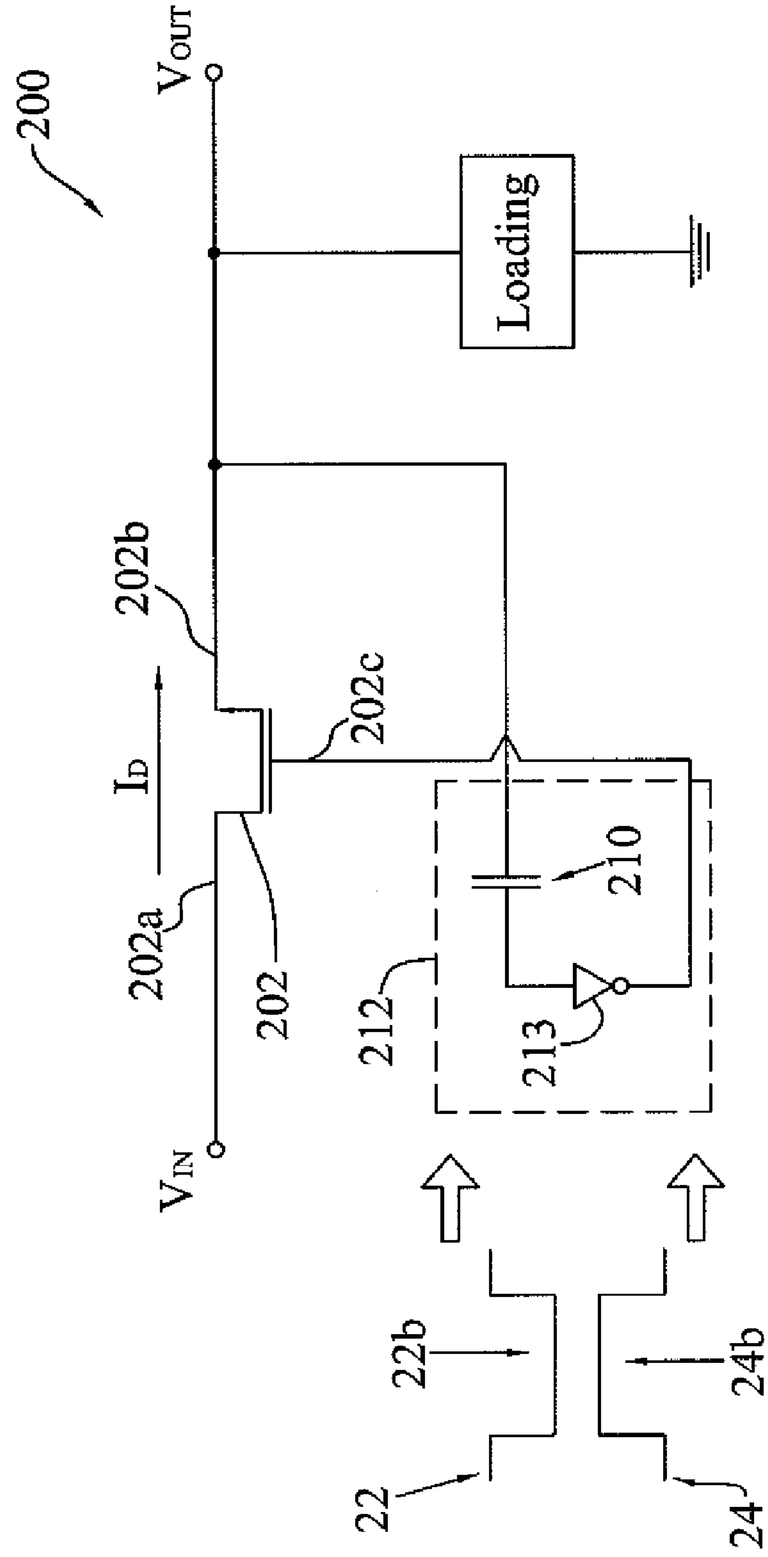
FIG. 3B illustrates the LDO of FIG. 2B in the stable mode.

FIG. 3B shows LDO 200 in the stable mode. During this stable mode, the first trigger signal 22 is at the logic low level 22*b*, the second trigger signal 24 is at the logic high level 24*b*, and the first switch 204, the fourth switch 214, the second switch (NTFT) 206, and the third switch (NTFT) as shown in FIG. 2B all become OFF. (Note that to better present the circuitry functions, some elements are omitted in FIG. 3B.) The output voltage Vout may go up or down due to the loading. If the output voltage Vout falls, the voltage at the input of inverting circuit 212, which is disposed between the regulating circuit output 202*b* and the regulating circuit control terminal 202*c*, will also go down. Because of the function of the inverter as well as the operating point formed according to ON of the fourth switch 214 in the aforementioned low drop-out mode, when the voltage at the input of inverting circuit 212 falls, the first inverter 213 will bring the voltage at the output of inverting circuit 212 up to the high level. That is, the voltage at the output of inverting circuit 212 goes up when the voltage at the input of inverting circuit 212 goes down. Therefore, the gate voltage $V_G$ at the regulating circuit control terminal 202*c*, which is connected to the output of the inverting circuit 212, will goes up accordingly. When the gate voltage $V_G$ arises, the gate-source voltage $V_{GS}$ also increases. Refer to the equation mentioned above. The drain current $I_D$ will increase to compensate the fall of the output voltage Vout, so the output voltage Vout will be pull up to the original stable level. Following the same circuitry principle, an increasing output voltage Vout could also be pull down, so the details are omitted hereinafter.

Figure 4:
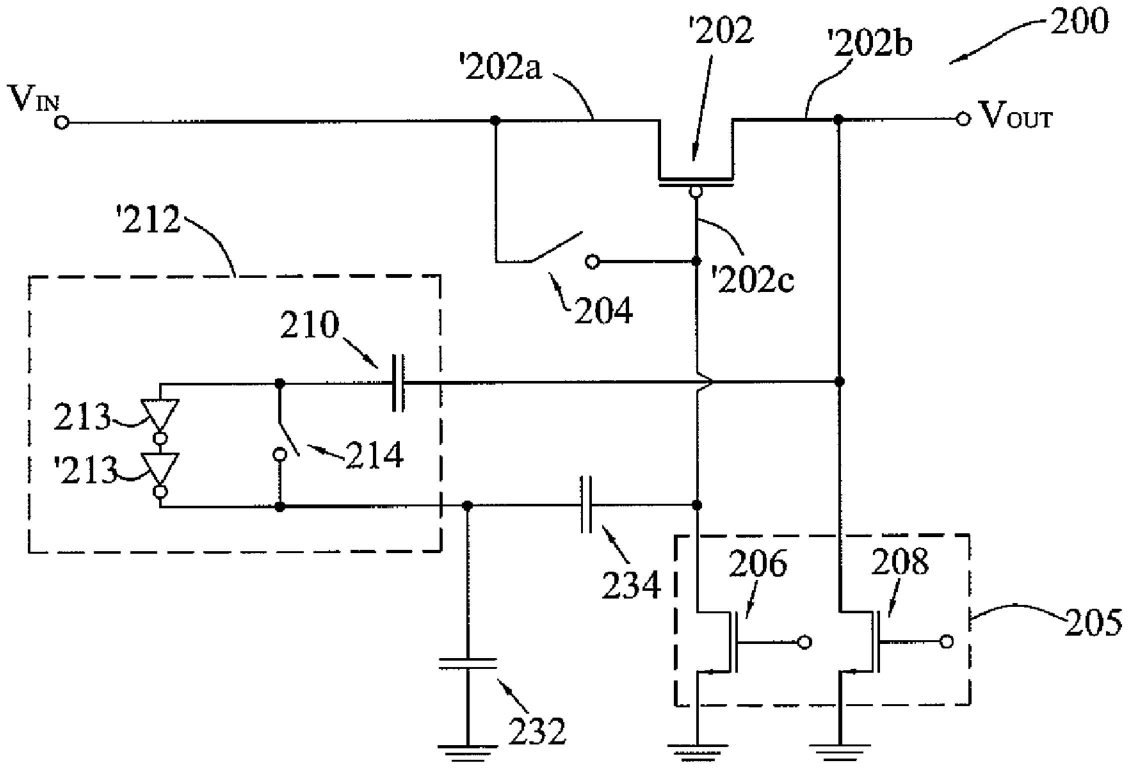
FIG. 4 illustrates a LDO according another embodiment of the present invention.

FIG. 4 shows LDO 200 of the display system 20, according to another embodiment of the present invention. The circuitry structures shown in FIG. 2B and FIG. 4 are similar, but the embodiment in FIG. 4 adopts PTFT as the regulating circuit 202' while FIG. 2B adopts NTFT as the regulating circuit 202. Furthermore, another inverter 213' is connected in series to the inverter 213 in FIG. 4.

LDO 200 shown in FIG. 4 also has the low drop-out mode and the stable mode, as the LDO 200 in FIG. 2B. As shown in FIG. 4, the source of PTFT 202' is coupled to the regulating circuit input 202'*a*, the drain is coupled to the output 202'*b*, and the gate is coupled to the control terminal 202'*c*. Further, the fourth switch 214 is disposed between the input of the inverter 213 and the output of the inverter 213'. Note that the operating voltage levels of PTFT 202' (in FIG. 4) and NTFT 202 (in FIG. 2B) are opposite, so LDO 200 in FIG. 4 requires another inverter 213' to inverse the input voltage. Accordingly, LDOs 200 in FIG. 4 and in FIG. 2B can have the same function for both the low drop-out mode and the stable mode.

With the embodiments discussed above, LDO in the display system of the present invention, compared with the conventional LDO, adopts simple circuitry design, without the need of error amplifiers and voltage dividers. Therefore the present invention has some advantages such as low power consumption and the stable output voltage and particularly suitable for some situations where power consumption should be low and the output voltage should be stable, such as for the design of Low-Temperature Poly-Silicon (LTPS) panel.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A display system, comprising:

a low drop-out voltage regulator (LDO) for receiving an input voltage and providing an output voltage, said LDO comprising:

a regulating circuit, comprising a regulating circuit input for receiving said input voltage, a regulating circuit output for outputting said output voltage, and a regulating circuit control terminal;

a first switch, disposed between said regulating circuit input and said regulating circuit control terminal, wherein said regulating circuit control terminal selectively receives said input voltage according to ON/OFF of said first switch;

a current source circuit for providing fixed current to said regulating circuit control terminal and said regulating circuit output; and an inverting circuit, comprising an inverting circuit input and an inverting circuit output, said inverting circuit input being coupled to said regulating circuit output, said inverting circuit output being coupled to said regulating circuit control terminal, said inverting circuit being provided for inverting said output voltage from said regulating circuit output so as to provide a control voltage to said regulating circuit control terminal, said control voltage having an opposite level with respect to said output voltage;

wherein said regulating circuit control terminal adjusts said output voltage in accordance with said control voltage received from said inverting circuit output.

2. A display system according to claim 1, wherein current source circuit comprises:

a second switch, disposed between said regulating circuit control terminal and a ground, wherein fixed current forms between said regulating circuit control terminal and said ground according to ON of said second switch; and a third switch, disposed between said regulating circuit output and said ground, wherein fixed current forms between said regulating circuit output and said ground according to ON of said third switch.

3. A display system according to claim 2, wherein said second switch is a first N type thin-film transistor (NTFT) and said third switch is a second NTFT.

4. A display system according to claim 3, wherein said first NTFT has a source connected to said ground, a drain connected to said regulating circuit control terminal, and a gate.

5. A display system according to claim 3, said second N type TFT has a source connected to said ground, a drain connected to said regulating circuit output, and a gate.

6. A display system according to claim 1, wherein said inverting circuit further comprises:

a first inverter, having a first inverter input connected to said inverting circuit input and a first inverter output connected to said inverting circuit output;

a first capacitor, having a node connected to said inverting circuit input and another node connected to said first inverter input; and a fourth switch, disposed between said first inverter input and said first inverter output, wherein a short or open circuit is formed between said first inverter input and said first inverter output according to ON/OFF of said fourth switch.

7. A display system according to claim 6, wherein said regulating circuit is a P type thin-film transistor (PTFT), and said LDO further comprises a second inverter connected to said first inverter in series.

8. A display system according to claim 6, wherein said first inverter comprises an NTFT and a PTFT.

9. A display system according to claim 6, wherein said first inverter comprises an NOR gate or an NAND gate.

10. A display system according to claim 6, wherein when said first switch, said second switch, said third switch, and said fourth switch become ON for a first duration, said regulating circuit output provides said output voltage lower than said input voltage; when said first switch, said second switch, said third switch, and said fourth switch become OFF for a second duration, said regulating circuit control terminal compensates said output voltage.

11. A display system according to claim 10, wherein a first trigger signal, selectively having a first voltage level and a second voltage level, is provided for determine ON/OFF of said second switch and said third switch, and a second trigger signal, also selectively having said first voltage level and said second voltage level, is provided for determine ON/OFF of said first switch and said fourth switch.

12. A display system according to claim 11, wherein for said first duration, said first trigger signal is on said first voltage level and said second trigger signal is on said second voltage level; for said second duration, said first trigger signal is on said second voltage level and said second trigger signal is on first voltage level.

13. A display system according to claim 12, wherein said first trigger signal and said second trigger signal are square-wave signals having a same period but opposite logic levels.

14. A display system according to claim 1, wherein said regulating circuit comprises a TFT.

15. A display system according to claim 1, further comprising a second capacitor disposed between said inverting circuit output and a ground to avoid high-frequency responses.

16. A display system according to claim 1, further comprising a display panel connected to said LDO for receiving said output voltage.

17. A display system according to claim 1, wherein said display system is a digital still-picture camera, a car navigation system, a mobile DVD-player, a gaming device, or a hand-held consumer appliance, a television, a computer monitor, a large-screen consumer electronics device, or a professional appliance.

* * * * *